(12) United States Patent
Musser et al.

(10) Patent No.: US 7,707,615 B2
(45) Date of Patent: Apr. 27, 2010

(54) ESTABLISHING A RETURN PATH IN A FORWARD PATH CABLE TELEVISION TESTING ENVIRONMENT

(75) Inventors: Dennis Musser, Charlotte, NC (US); Marin Moreno, Charlotte, NC (US)

(73) Assignee: Time Warner Cable, Inc., New York, NY (US)

( * ) Notice: Subject to any disclaimer, the term of this patent is extended or adjusted under 35 U.S.C. 154(b) by 1397 days.

(21) Appl. No.: 10/865,167

(22) Filed: Jun. 10, 2004

(65) Prior Publication Data

US 2005/0276226 A1  Dec. 15, 2005

(51) Int. Cl.
*H04N 7/173* (2006.01)
(52) U.S. Cl. ..................................... 725/107
(58) Field of Classification Search ................. 370/229, 370/230, 235, 254, 468, 241; 709/208; 725/107
See application file for complete search history.

(56) References Cited

U.S. PATENT DOCUMENTS

| | | | |
|---|---|---|---|
| 5,815,794 A * | 9/1998 | Williams | 725/125 |
| 6,598,229 B2 * | 7/2003 | Smyth et al. | 725/107 |
| 7,010,730 B1 * | 3/2006 | Jaworski et al. | 714/704 |
| 2001/0011375 A1 * | 8/2001 | Yun | 725/107 |
| 2002/0031224 A1 * | 3/2002 | Basawapatna et al. | 380/211 |
| 2003/0066082 A1 * | 4/2003 | Kliger et al. | 725/80 |
| 2003/0167319 A1 * | 9/2003 | Venkatesulu et al. | 709/223 |
| 2004/0073937 A1 * | 4/2004 | Williams | 725/107 |

\* cited by examiner

*Primary Examiner*—Brian T Pendleton
*Assistant Examiner*—Cai Chen
(74) *Attorney, Agent, or Firm*—The Marbury Law Group, PLLC

(57) ABSTRACT

A system and method for establishing a return path in a cable television test environment. A cable television test environment comprising a plurality of head-ends connected to a plurality of set top boxes through a one-way forward matrix switch having "M" inputs and "N" outputs is adapted to provide a reverse path for each of the available "N" outputs. A low band reverse signal is received from each of a plurality of set top boxes. The low band reverse signal from each of the plurality of set top boxes is combined to produce a composite signal. The composite signal is split into a plurality of composite signal sources. Each of the composite signal sources is sent to each of the plurality of head-ends (M) via the transmission means connecting that head-end to the matrix switch. The low band composite QPSK signal from the source diplexer travels in the reverse direction to the head-end. Each head-end is assigned a unique set of frequencies for return communications from the STBs serviced by that head-end. A QPSK demodulator in a head-end demodulates its assigned return frequencies as they appear in the low band composite QPSK signal.

10 Claims, 3 Drawing Sheets

ESTABLISHING A RETURN PATH IN A FORWARD PATH CABLE TELEVISION TESTING ENVIRONMENT

BACKGROUND

Embodiments of the present invention are generally related to RF matrix switching systems, and more particularly to provide a return path in a forward path RF matrix switching system for use in a cable television system.

The primary function of a switch fabric is to pass traffic between input and output interface cards (referred to as the "forward" direction). RF matrix switches are designed to connect input signals from multiple sources to any one of a set of output devices. Typically, an output may have only one input. The forward path input-to-output switching is managed via a controller that maps the inputs and outputs and allows for reconfiguration on the fly.

In a cable environment, RF matrix switches are used to switch signals from multiple head-ends to set top boxes (STBs) for testing and evaluation. Manufacturers of STBs are constantly revising and upgrading STBs to add functionality, improve performance, and to reduce manufacturing costs. It is important for cable providers to test STBs under "real-world" conditions using live signals from operating head-ends before placing such devices in service. However, changes in the real-world requirements for STBs have not been met with concomitant changes in RF matrix switch technology.

The earliest cable television (CATV) systems were, in effect, strategically placed antennas with very long coax cables connecting them to subscribers' television sets. Content was transmitted as an analog signal and the signal path was one-way from the cable head-end to the subscriber's terminal (that is, the "forward" direction). As the number of program options grew, the bandwidth of cable systems also increased. Early systems operated at 200 MHz, allowing 33 channels. As technology progressed, the bandwidth increased to 550 MHz, with the number of channels increasing to 91.

In 1976, the coax trunk cables that carry signals from the CATV head-end to distribution nodes were replaced with fiber-optic cables, leaving only the drop to the subscriber as copper-based. The hybrid fiber network (HFN) offered many advantages over the pure copper-coax cable networks. From a technical perspective, fiber-optic cable does not suffer the same signal losses as coaxial cable, which eliminated the need for so many amplifiers. Decreasing the number of amplifiers made dramatic improvements in signal quality and system reliability and made possible two-way communication over the HFN.

With the introduction of digital signal processing in the late eighties, the analog redistribution system of the fifties entered the digital age. Digital processing and fiber-optic cable made it possible for signals to be sent from the subscriber to the head-end (that is, the "reverse" direction). In the 1990s, cable providers took advantage of the digital architecture to provide Internet access through cable modems. Other services are being planned, including voice over Internet Protocol.

The set top box was originally introduced to convert analog signals from cable head-ends to television channel frequencies that could be viewed on a television. Like other components in the CATV system, the set top box has evolved into an addressable terminal that can be accessed by the CATV system operator and, more recently, that provides a return path for communications initiated by a subscriber. Because current RF matrix switches provide one-way forward path connectivity between head-ends and STBs, there is no automated system for testing the forward path functions of an STB.

It is desirable to implement systems and methods to provide a path for a return signal from an STB to a head-end in a CATV testing environment.

SUMMARY

Embodiments of the present invention implement systems and methods to provide a path for a return signal from an STB to a head-end in a CATV testing environment. In an exemplary embodiment of the present invention, a one-way forward matrix switch having "M" inputs and "N" outputs (referred to as an "M×N" switch) is adapted to provide a reverse path for each of the available outputs. In the exemplary embodiment, each of input "M" is connected to the high leg of a source diplexer. A head-end is connected to a common port of the source diplexer. Each of the "N" outputs is connected to an output module. The output module comprises a highpass filter for passing the high-band head-end QPSK/QAM signal to a STB along a forward signal path. A high-band QPSK/QAM signal thus passes in the forward direction through the source diplexer to an input terminal of the switch where it is routed to a selected switch output terminal. The high-band QPSK/QAM signal then passes through the output module to an STB.

The output module also directs a low band QPSK signal from the STB along a reverse signal path to a combining process. The highpass filter isolates the low band QPSK signal from entering the forward signal path. The QPSK signal from the combining process is a composite of the low band QPSK signals from all of the return paths. The combined (or "composite") QPSK signal is then split into "M" sources each providing the combined QPSK signal. Each of the "M" sources is directed to the low leg of the source diplexer connected to an input terminal of the switch. The source diplexer isolates the low band composite QPSK signal from the switch input. The low band composite QPSK signal from the source diplexer travels in the reverse direction to the head-end. Each head-end is assigned a unique set of frequencies for return communications from the STBs serviced by that head-end. A QPSK demodulator in a head-end demodulates its assigned return frequencies as they appear in the low band composite QPSK signal.

It is an aspect of the present invention to provide a return path from an interactive STB connected to a head-end through an RF matrix switch without modification to the switch.

It is another aspect of the present invention to provide a return path from an interactive STB connected to a head-end through an RF matrix switch without requiring manual patching of return path signal cables.

It is still another aspect of the present invention to provide a return path from an interactive STB connected to a head-end through an RF matrix switch using the forward path cabling.

It is yet another aspect of the present invention to provide a return path from selected interactive STBs each connected to a head-end through an RF matrix switch.

These and other aspects of the present invention will become apparent from a review of the general and detailed descriptions that follow.

An embodiment of the present invention provides a cable television testing environment with a return path. An RF matrix switch comprises an input terminal that receives a high-band forward input signal from a head-end via a transmission path, and an output terminal connected to a set top box through an output module. The RF matrix switch is adapted to map the high-band forward input signal received by the input terminal to the output terminal. The output module is adapted to pass the high band forward input signal to the set top box and pass a low band reverse signal from the return path set top box to a combining/splitting module. The output module is further adapted to isolate the low band reverse signal from the set top box from the output terminal to which it is connected.

The combining/splitting module adapted to combine the low band reverse signal from the set top box with one or more low band reverse signal from other set top boxes to produce a composite signal. The composite signal is split into composite signal sources. One of the composite signal sources is connected to the head-end via the transmission path connected to that head-end to provide the return path. In another embodiment of the present invention, the composite signal is connected to the head-end via the transmission path connected to that head-end to provide the return path.

Another embodiment of the present invention provides a method for establishing a return path in a cable television testing environment. A low band reverse signal is received from a set top box. The low band reverse signal from the set top box is combined with the low band reverse signal from one or more other return path set top boxes to produce a composite signal. The composite signal is split into composite signal sources. One of the signal sources is connected to a head-end via the transmission means connected to that head-end to provide the return path. In another embodiment of the present invention, the composite signal is connected to the head-end via the transmission path connected to that head-end to provide the return path. In still another embodiment of the present invention, a high-band forward input signal applied to an input terminal of an RF matrix switch is mapped to an output terminal of the RF matrix switch connected to the set top box.

DETAILED DESCRIPTION

Figure 1:
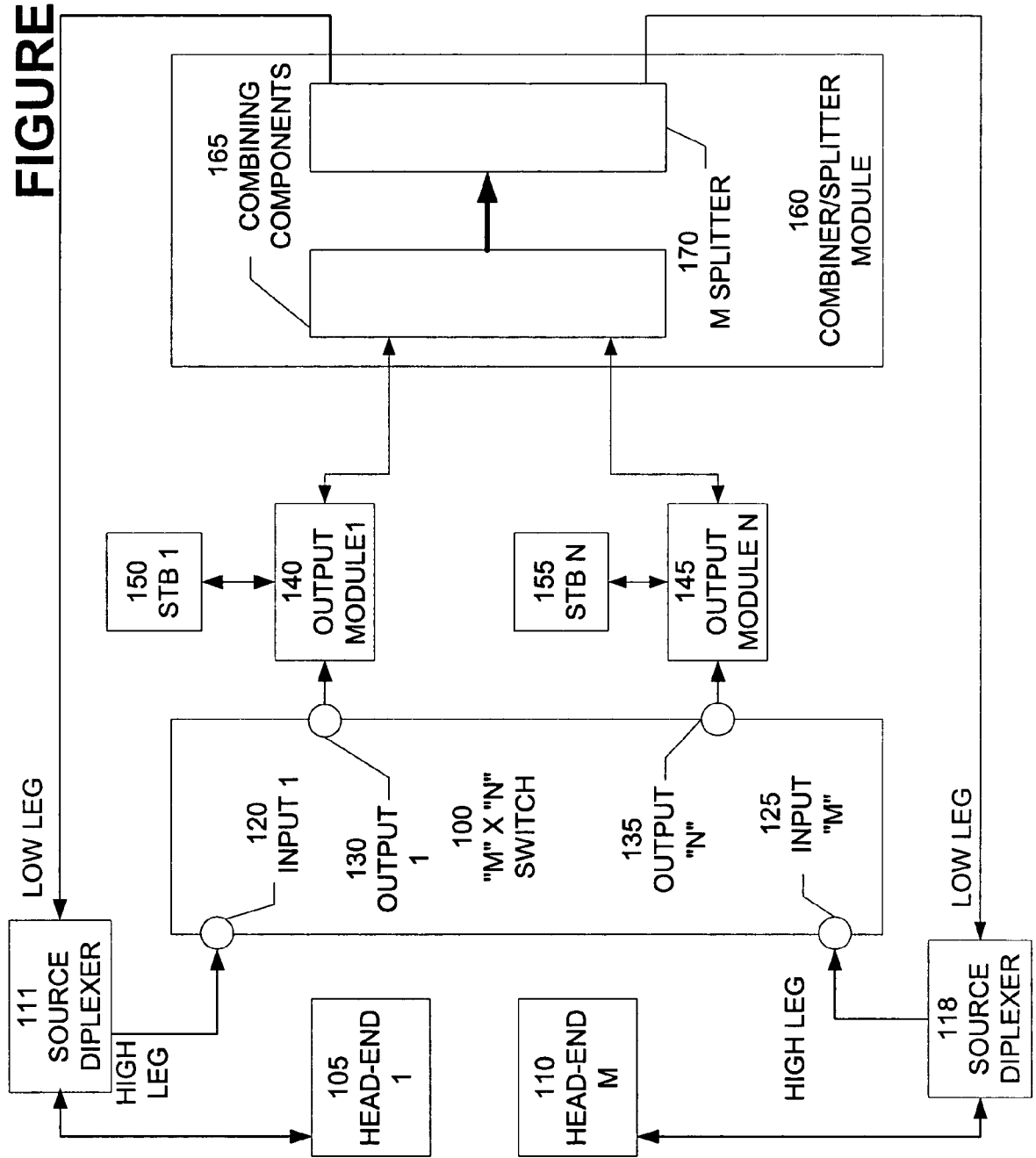
FIG. 1 illustrates a block diagram of a generalized STB test environment with a return path according to embodiments of the present invention.

The following terms used in the description that follows. The definitions are provided for clarity of understanding

| CATV | cable television. |
|---|---|
| combiner | a passive device for combining or multiplexing signals. |
| diplexer | a three-port frequency-dependent devices that may be used as a separator or a combiner of signals. The device consists of two fixed tuned bandpass filters sharing a common port. The common port and the output of the two filters (high leg and low leg) form the three terminals of the diplexer. Signals applied to common port are separated in accordance with their passband frequencies of the filters. Signals applied to either uncommon port are isolated from the other uncommon port and are combined at the common port. |
| head-end | a CATV provider's local facility that originates and communicates cable modem and cable TV services to its subscribers. |
| hi-pass filter | a filter that permits signals within a relatively high frequency band to pass while blocking all lower signals. |
| High leg | the high-band signal output of a diplexer. |
| low leg | the low band signal output of a diplexer. |
| QPSK | quadraphase-shift keying; a form of modulation of a in which a carrier undergoes four changes in phase (four symbols) and can thus represent 2 binary bits of data per symbol. |
| QPSK demodulator | a device that demodulates the QPSK carrier and recovers the digital information conveyed in the signal |
| STB | a set top box. As used in this application, the STB comprises interactive means that allows the STB to send a signal to a head-end. |

Embodiments of the present invention implement systems and methods to provide a path for a return signal from an STB to a head-end in a CATV testing environment. In an exemplary embodiment of the present invention, a one-way forward matrix switch having "M" inputs and "N" outputs (referred to as an "M×N" switch) is adapted to provide a reverse path for each of the available outputs. In the exemplary embodiment, each of input "M" is connected to the high leg of a source diplexer. A head-end is connected to a common port of the source diplexer. Each of the "N" outputs is connected to an output module. The output module comprises a highpass filter for passing the high-band head-end QPSK/QAM signal to a STB along a forward signal path. A high-band QPSK/QAM signal thus passes in the forward direction through the source diplexer to an input terminal of the switch where it is routed to a selected switch output terminal. The high-band QPSK/QAM signal then passes through the output module to an STB.

The output module also directs a low band QPSK signal from the STB along a reverse signal path to a combining process. The highpass filter isolates the low band QPSK signal from entering the forward signal path. The QPSK signal from the combing process combines low band QPSK signals from all of the return paths. The combined (or "composite") QPSK signal is then split into "M" sources each providing the combined QPSK signal. Each of the "M" sources is directed to the low leg of the source diplexer connected to an input terminal of the switch. The source diplexer isolates the low band composite QPSK signal from the switch input. The low band composite QPSK signal from the source diplexer travels in the reverse direction to the head-end. Each head-end is assigned a unique set of frequencies for return communications from the STBs serviced by that head-end. A QPSK demodulator in a head-end demodulates its assigned return frequencies as they appear in the low band composite QPSK signal.

FIG. 1 illustrates a block diagram of a generalized STB test environment with a return path according to embodiments of the present invention. A head-end 1 105 is connected to a common port of a source diplexer 111. The high leg of source diplexer 111 is connected to an input terminal 1 120 on an M×N matrix switch 100. In an embodiment of the present invention, the head-end 1 105 provides a high-band forward QPSK signal in a range from 50 to 100 MHz to source diplexer 111. Input terminal 120 is mapped to output terminal 1 130. Output terminal 1 130 is connected to output module 1 140. Output module 1 140 passes the high-band forward QPSK signal from head-end 1 105 to STB 1 150.

STB 1 150 generates a low-band QPSK return signal. In an embodiment of the present invention, the low-band return QPSK signal is in a range of 5-40 MHz. The low-band return QPSK signal is passed to the output module 140 to combiner/splitter 160.

A head-end 8 110 is connected to a common port of a source diplexer 118. The high leg of source diplexer 118 is connected to an input terminal "M" 125 on M×N matrix switch 100. In an embodiment of the present invention, terminal 125 is mapped to output terminal "N" 135. Output terminal "N" 135 is connected to output module "N" 145. Output module "N" 145 passes the high-band forward QPSK signal from head-end M 110 to STB N 155.

STB N 155 generates a low-band QPSK return signal. In an embodiment of the present invention, the low-band return QPSK signal is in a range of 5-40 MHz. The low-band return QPSK signal is passed to through the output module 145 to combiner/splitter 160.

Each output terminal of matrix switch 100 may be similarly directed to an output module to provide a return signal from the STB associated with that output. As will be apparent to those skilled in the art, the number of output terminals equipped with a reverse signal path is selectable by the test environment operator and maybe less than "N."

The combining/splitting module 160 comprises combining components 165 and an "M" splitter 170. Combining components 165 generate a composite return signal comprising the low-band return QPSK signal for each STB for which a return path is desired. The low-band return QPSK signal from each STB is combined in stages until a single composite signal is obtain. "M" splitter 170 provides a composite signal source for each head-end servicing STBs having a reverse path. As will be apparent to those skilled in the art, the number of head-ends servicing STBs having a reverse path is selectable by the test environment operator and may range from 1 to M.

Each of the "M" composite signal sources from "M" splitter 170 is connected to the low leg port of a source diplexer associated with each of the "M" input terminals of matrix switch 100 (only source diplexers 111 and 118 are illustrated for clarity). The source diplexer operates as a low pass filter by allowing the composite signal to travel in the direction of the head-end connected to the common port of that source diplexer while isolating the composite signal from the input terminal connected to the high leg port of the source diplexer.

Figure 2:
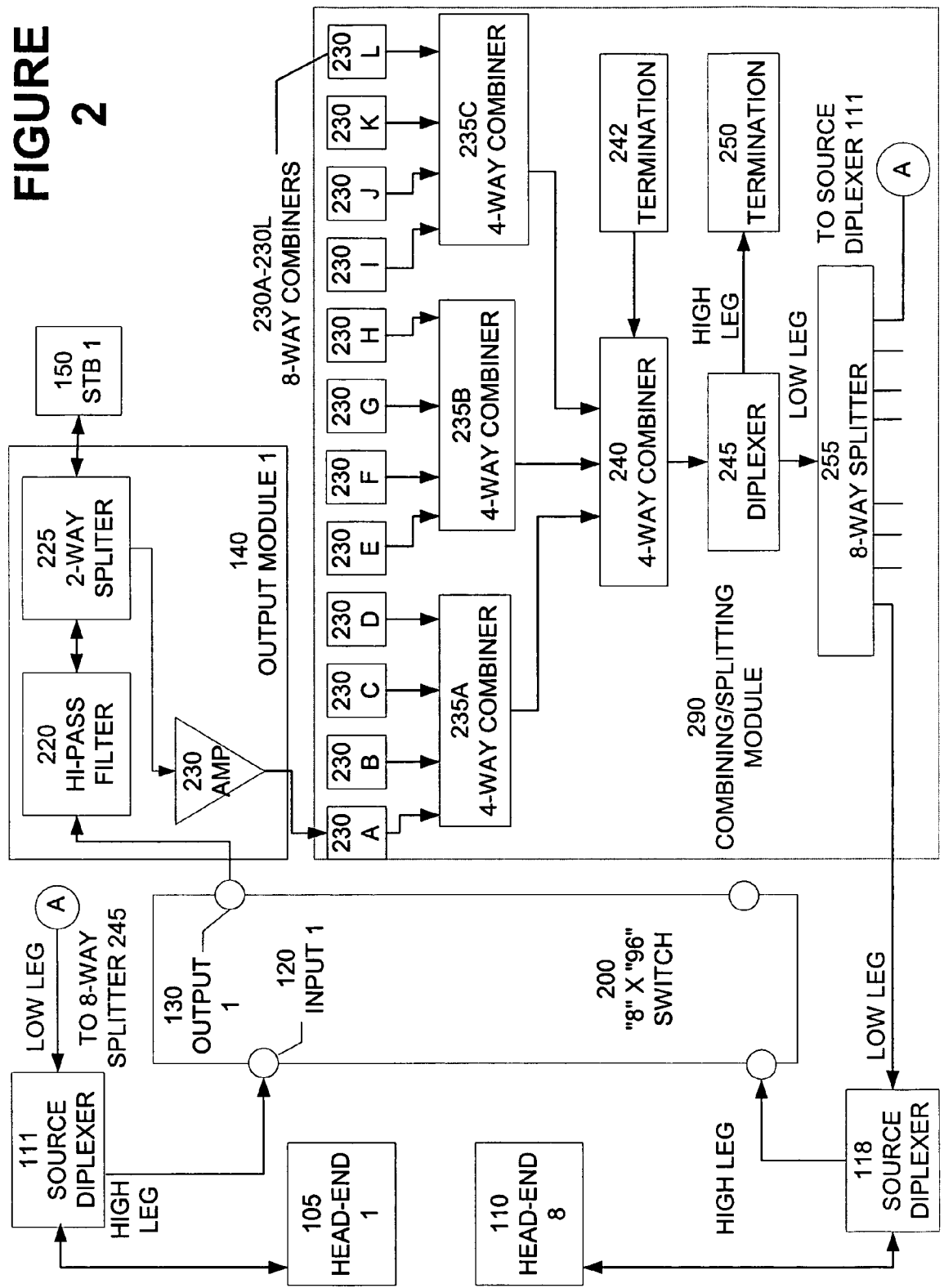
FIG. 2 illustrates an STB test environment using a 8×96 RF matrix switch architecture with a return path according to embodiments of the present invention.

FIG. 2 illustrates an STB test environment using an 8×96 RF matrix switch architecture with a return path according to embodiments of the present invention. While an 8×96 switch is described, the present invention is not so limited. As will be apparent to those skilled in the art, a one-way forward matrix switch with any ratio of inputs to outputs may be adapted to provide a reverse signal path as described herein using combiners of varying multiples to create a composite return signal with departing from the scope of the present invention.

A head-end 1 105 is connected to a common port of a source diplexer 111. The high leg of source diplexer 111 is connected to an input on an 8×96 matrix switch 200. In an embodiment of the present invention, the head-end 1 105 provides a high-band forward QPSK/QAM signal in a range from 50 to 100 MHz to source diplexer 111. A head-end 8 110 is connected to a common port of a source diplexer 118 and provides a high-band forward QPSK/QAM signal in a range from 50 to 100 MHz to source diplexer 118. The high leg of source diplexer 118 is connected to an input on an 8×96 matrix switch 200. While only two input connections are illustrated in FIG. 2, up to 8 head-ends may be connected through diplexers to the input side of matrix switch 200.

The high-band forward QPSK/QAM signal from the high leg port of source diplexer 111 is passed from an input terminal of matrix switch 200 to an output terminal selected by a controller (not illustrated). The output terminal associated with the high-band forward QPSK/QAM signal from source diplexer 118 is connected to a different STB (not illustrated) via a different output module (not illustrated). All output modules comprise components that are illustrated for output module 1 140.

The output module 1 140 comprises a hi-pass filter 220, a 2-way splitter 225 and an amplifier 230. Hi-pass filter 220 receives the high-band forward QPSK/QAM signal associated with head-end 1 105 and passes the high-band forward QPSK/QAM signal to an output port of 2-way splitter 225. The high-band forward QPSK/QAM signal is received by STB 1 150.

A low-band return signal is generated by STB 1 150. In an embodiment of the present invention, the low-band return QPSK signal is in a range of 5-40 MHz. The low-band return QPSK signal is received at the common port of a 2-way splitter 225. The low-band return QPSK signal is presented to both output ports of a 2-way splitter 225. As described above, one output port of a 2-way splitter 225 is connected to hi-pass filter 220, which isolates the low-band return QPSK signal from matrix switch 200. The other output port of a 2-way splitter 225 received on the input side of amplifier 230 and amplified to overcome losses attributable to a 2-way splitter 225. The output of amplifier 230 is then routed through a combining/splitting module 290 described below.

Each output terminal of matrix switch 200 may be similarly directed to an output module to provide a return signal from the STB associated with that output. As will be apparent to those skilled in the art, the number of output terminals equipped with a reverse signal path is selectable by the test environment operator.

The combining/splitting module generates a composite return signal comprising the low-band return QPSK signal for each STB for which a return path is desired. For clarity purposes, the combining/splitting module 290 illustrated in FIG. 2 provides a return path for each output terminal. The components in FIG. 2 have been selected to accommodate the 8×96 matrix switch of the exemplary embodiment. As will be apparent to those skilled in the art, components performing similar functions as those illustrated in FIG. 2 may be used for other matrix switch implementations without departing from the scope of the present invention.

The combining/splitting module 290 comprises 12 8-way combiners (230A-230L) and thus provides a low-band return QPSK signal input for each of 96 STBs. The output of each 8-way combiner 230 is a first stage composite signal derived from the low-band return QPSK signal of 8 STBs.

The first stage composite signals from each of the 12 8-way combiner 230 are fed to 3 4-way combiners (235A, B, and C) in groups of four. Thus, the first stage composite signals from 8-way combiners 230 A-D are fed to 4-way combiner 235A, the first stage composite signals from 8-way combiners 230 E-H are fed to 4-way combiner 235B, and the first stage composite signals from 8-way combiners 230 I-L are fed to 4-way combiner 235C. The output of each 4 way combiner 235A-C is a second stage composite signal derived from the low-band return QPSK signal of 32 STBs.

The second stage composite signals from each of the 3 4-way combiners (235A, B, and C) are fed to a final 4-way combiner 240. As only 3 input ports on the final 4-way combiner 240 are used, a fourth input port is connected to a termination device 242 to prevent the introduction of noise into the combined signal. The output of final 4-way combiner 240 is a third stage composite signal derived from the low-band return QPSK signal of all 96 STBs.

The third stage composite signal is fed to the common port of a diplexer 245. Diplexer 245 is used as a low pass filter. The high leg port is connected to a termination 250. The low leg port of diplexer 245 is connected to an 8-way splitter that creates 8 signal feeds each comprising the third stage composite signal. Each signal feed is connected to the low leg port of a source diplexer associated with each of the input terminals of matrix switch 200 (only source diplexers 111 and 118 are illustrated for clarity). The source diplexer operates as a low pass filter by allowing the third stage composite signal to travel in the direction of the head-end connected to a common port of that source diplexer while isolating the third stage composite signal from the input terminal connected to the high leg port of the source diplexer.

Figure 3:
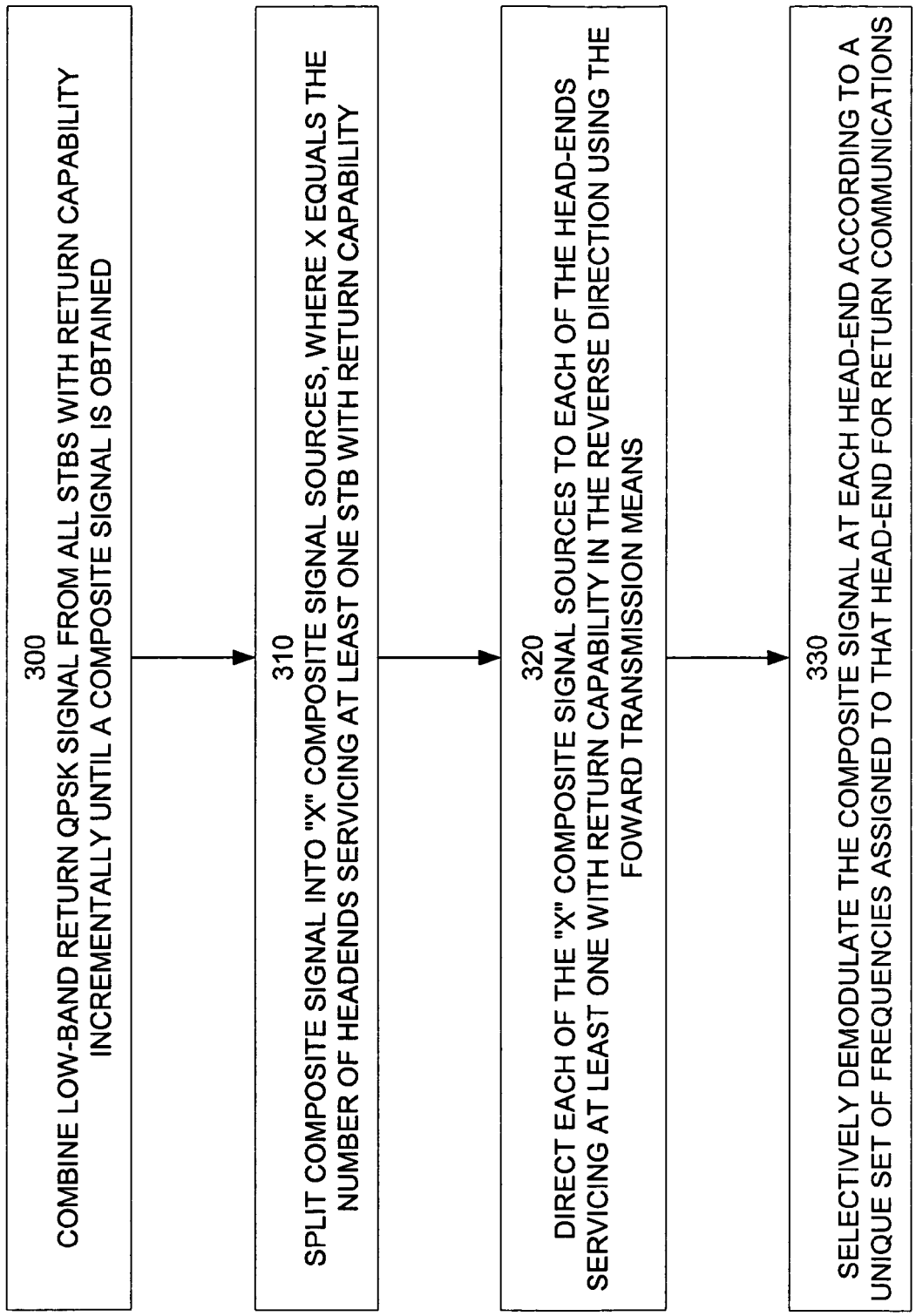
FIG. 3 illustrates the flow of a process for incorporating a low band QPSK return path in STB test environment using an "M" by "N" (M×N) RF Matrix switch according to embodiments of the present invention.

FIG. 3 illustrates the flow of a process for incorporating a low band QPSK return path in STB test environment using an "M" by 'N' (M×N) RF Matrix switch according to embodiments of the present invention. The low-band return QPSK signal from all STBs with return capability is combined incrementally until a composite signal is obtained 300. Referring again to FIG. 3, an exemplary embodiment is illustrated in which 96 low-band return QPSK signals are combined using 12 8-way combiners to produce 12 first stage composite signals. The 12 first stage composite signals are combined in groups of 4 to produce 3 second stage composite stage composite signals each comprising 32 low-band return QPSK signals. The 3 second stage composite signals are combined to produce a composite signal comprising all 96 low-band return QPSK signals. As will be apparent to those skilled in the art, other combining architectures may be deployed to create the composite signal without departing from the scope of the present invention.

Referring again to FIG. 3, the composite signal is split into "X" composite signal sources, where "X" is the number of unique head-ends servicing an STB with return capability 310. Referring again to FIG. 2, an exemplary embodiment is illustrated in which 8 head-ends service the 96 STBs having low-band return QPSK signal capability. Thus, the composite signal is split into 8 sources, one for each of the cable head-end inputs. As will be apparent to those skilled in the art, other splitting architectures may be deployed to create a composite signal source for each head-end servicing an STB with return capability without departing from the scope of the present invention Each of the "X" composite signal sources is directed to each of the head-ends servicing an STB with return capability in the reverse direction using the forward transmission means 320. The composite signal is then selectively demodulated by a head-end according to a unique set of frequencies assigned to that head-end for return communications 330.

A system and method for establishing a return path in a forward path RF matrix switching architecture has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A cable television testing environment with a return path comprising:
    a one-way RF matrix switch comprising:
        an input terminal, wherein the input terminal receives a high-band input signal from a head-end via a transmission path; and
        an output terminal, wherein the output terminal is assigned to a selected set top box and is connected to the selected set top box via an output module assigned to the selected set top box,
    and wherein the one-way RF matrix switch maps the high-band input signal from the head-end as received by the input terminal forward to the output terminal assigned to the selected set top box; and
    wherein the output module:
        passes the high band input signal to the selected set top box;
        passes a low band reverse signal from the selected set top box to a combining/splitting module; and
    wherein the combining/splitting module:
        combines the low band reverse signal from the selected set top box with one or more other low band reverse signals from other set top boxes to produce a composite signal; and
        splits the composite signal into a plurality of composite signal sources, wherein one of the plurality of composite signal sources is connected to the head-end via the transmission path thereby providing the return path from the selected set top box to the head-end, and wherein the return path does not pass through the one-way RF matrix switch.

2. The cable television testing environment of claim 1 wherein the output module isolates the low band reverse signal from the set top box from the output terminal to which the set top box is connected.

3. A method for testing a selected set top box in a cable television testing environment comprising:
    configuring an input terminal of one-way RF matrix switch to receive a high-band input signal from a head-end via a transmission path;
    assigning an output terminal of the one-way RF matrix switch to the selected set top box;
    mapping the high-band input signal from the head-end as received by the input terminal forward to the output terminal assigned to the selected set top box;
    passing the high-band input signal to the selected set top box;
    receiving a low band reverse signal from the selected set top box;
    combining the low band reverse signal from the selected set top box with one or more other low band reverse signals from other set top boxes to produce a composite signal;
    splitting the composite signal into a plurality of composite signal sources; and
    connecting one of the plurality of composite signal sources to the head-end via a transmission path connected to that head-end thereby providing the return path and wherein the return path does not pass through the one-way RF matrix switch.

4. The method for establishing a return path in a cable television testing environment as in claim 3, the method further comprising:
    isolating the low band reverse signal from the set top box from the output terminal to which the set top box is connected.

5. The cable television testing environment of claim 1, wherein the RF high-band input signal is a QPSK/QAM signal and the low band reverse signal is a QPSK signal.

6. The method of claim 3, wherein the high-band input signal is a QPSK/QAM signal and the low band reverse signal is a QPSK signal.

7. The cable television testing environment of claim 1, wherein the headend is assigned a set of frequencies within the composite signal, wherein the headend comprises a demodulator and wherein the demodulator demodulates the assigned set of frequencies when they appear in a composite signal source received by the set top box.

8. The method of claim 3 further comprising:
assigning the head-end a set of frequencies within the composite signal; and
demodulating the assigned set of frequencies at the head-end when they appear in a composite signal source received by the set top box.

9. A cable television testing environment with a return path comprising:
a one-way RF matrix switch comprising:
a plurality of "M" input terminals, wherein each of the "M" input terminals is associated with, and receives a high-band input signal from, one of "M" head-ends via a transmission path; and
"N" output terminals, wherein N≧M and wherein each of the "N" output terminals is associated with, and is assigned to, at least one selected set top box and is connected to the at least one selected set top box via an output module assigned to the selected set top box,
and wherein the one-way RF matrix switch maps the high-band input signal from each of the "M" head-ends as received by its associated input terminal forward to the output terminal assigned to the at least one selected set top box; and
wherein the output module:
passes the high band input signal from the output terminal associated with the at least one selected set top box to the at least one selected set top box; and
passes a low band reverse signal from the at least one selected set top box to a combining/splitting module; and
wherein the combining/splitting module:
combines the low band reverse signal from the at least one selected set top box with one or more other low band reverse signals from other set top boxes to produce a composite signal; and
splits the composite signal into a plurality of composite signal sources, wherein one of the plurality of composite signal sources is connected to the head-end via the transmission path thereby providing the return path from the selected set top box to the head-end.

10. A cable television testing environment with a return path comprising:
a one-way RF matrix switch comprising:
an input terminal, wherein the input terminal receives a high-band input signal from a head-end via a transmission path; and
an output terminal, wherein the output terminal is assigned to a selected set top box and is connected to the selected set top box via an output module assigned to the selected set top box,
and wherein the one-way RF matrix switch maps the high-band input signal from the head-end as received by the input terminal forward to the output terminal assigned to the selected set top box; and
wherein the output module:
passes the high band input signal to the selected set top box;
passes a low band reverse signal from the selected set top box to a combining/splitting module; and
wherein the combining/splitting module:
combines the low band reverse signal from the selected set top box with one or more other low band reverse signals from other set top boxes to produce a composite signal; and
splits the composite signal into a plurality of composite signal sources, wherein one of the plurality of composite signal sources is connected to the transmission path via an unswitched path thereby providing the return path from the selected set top box to the head-end.

* * * * *